United States Patent

[15] 3,636,750

Wojcik

[45] Jan. 25, 1972

[54] DEVICE FOR MEASURING TARE AND CALIBRATION ERRORS OF CONVEYOR BELT WEIGHING SCALES

[72] Inventor: Matthew H. Wojcik, Garfield, N.J.

[73] Assignee: Merrick Scale Mfg. Company, Passaic, N.J.

[22] Filed: Aug. 24, 1970

[21] Appl. No.: 66,540

[52] U.S. Cl. ..............................................................73/1 B
[51] Int. Cl. ....................................................G01g 23/00
[58] Field of Search ..........................73/1 A, 1 B; 324/115

[56] References Cited

UNITED STATES PATENTS

| | | | |
|---|---|---|---|
| 2,864,999 | 12/1958 | Sullivan | 324/115 |
| 2,974,518 | 3/1961 | Jones | 73/1 B |
| 3,236,091 | 2/1966 | Cohn | 73/1 R |
| 3,381,516 | 5/1968 | Maples | 73/1 R |

*Primary Examiner*—S. Clement Swisher
*Attorney*—John A. Seifert

[57] ABSTRACT

The electrical rate output signal of an endless conveyor belt scale, consisting of the product of the load on the conveyor belt and the rate of travel of the conveyor belt, or the amplified weight of the load with the rate of travel of the conveyor belt constant, varies positively and negatively due to the tare weight variations of the conveyor belt and said tare weight variations are averaged out so that the algebraic sum of all the tare signal variations equal zero when the endless conveyor belt makes one complete revolution or multiple revolutions. The endless conveyor belt scale is also calibrated by a specified signal level having a magnitude equal to the signal level produced by either test chains or test weights on an endless conveyor belt weight sensing platform.

19 Claims, 5 Drawing Figures

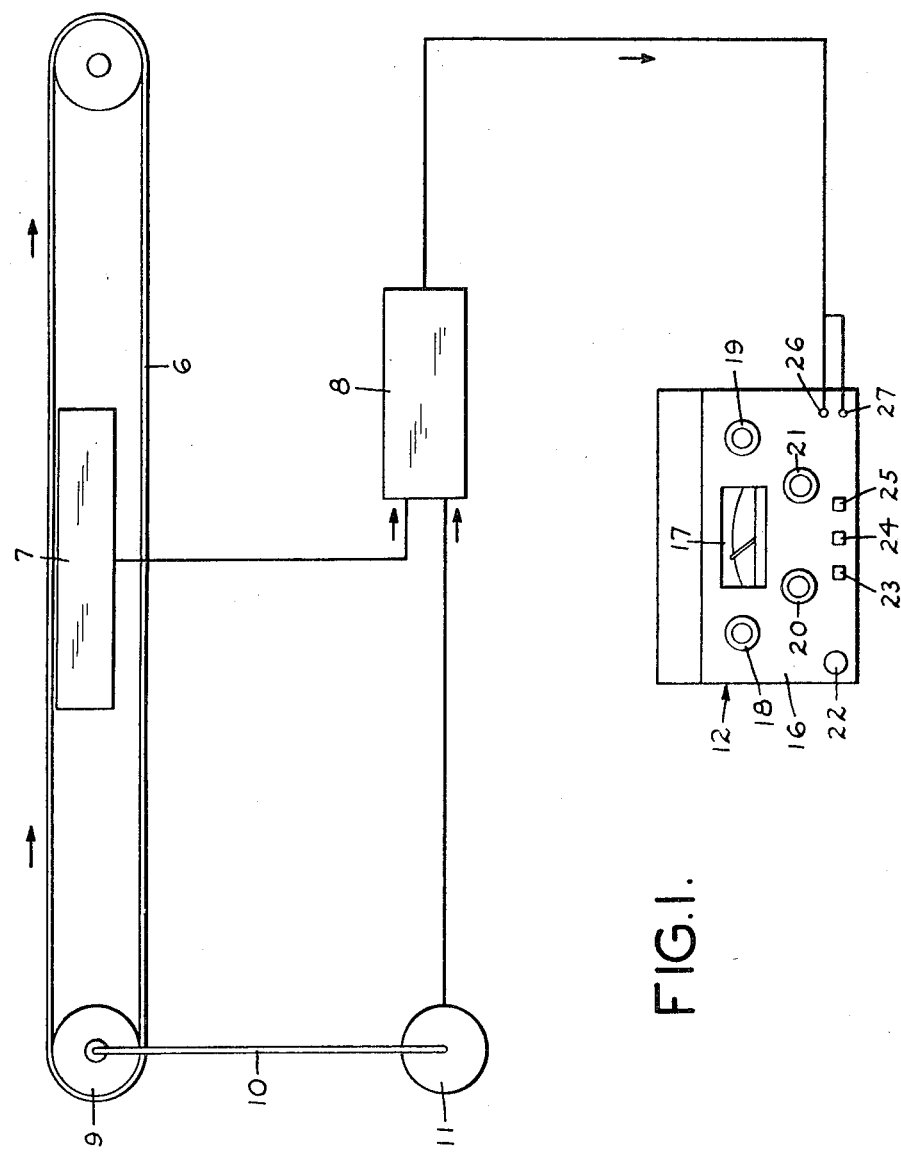

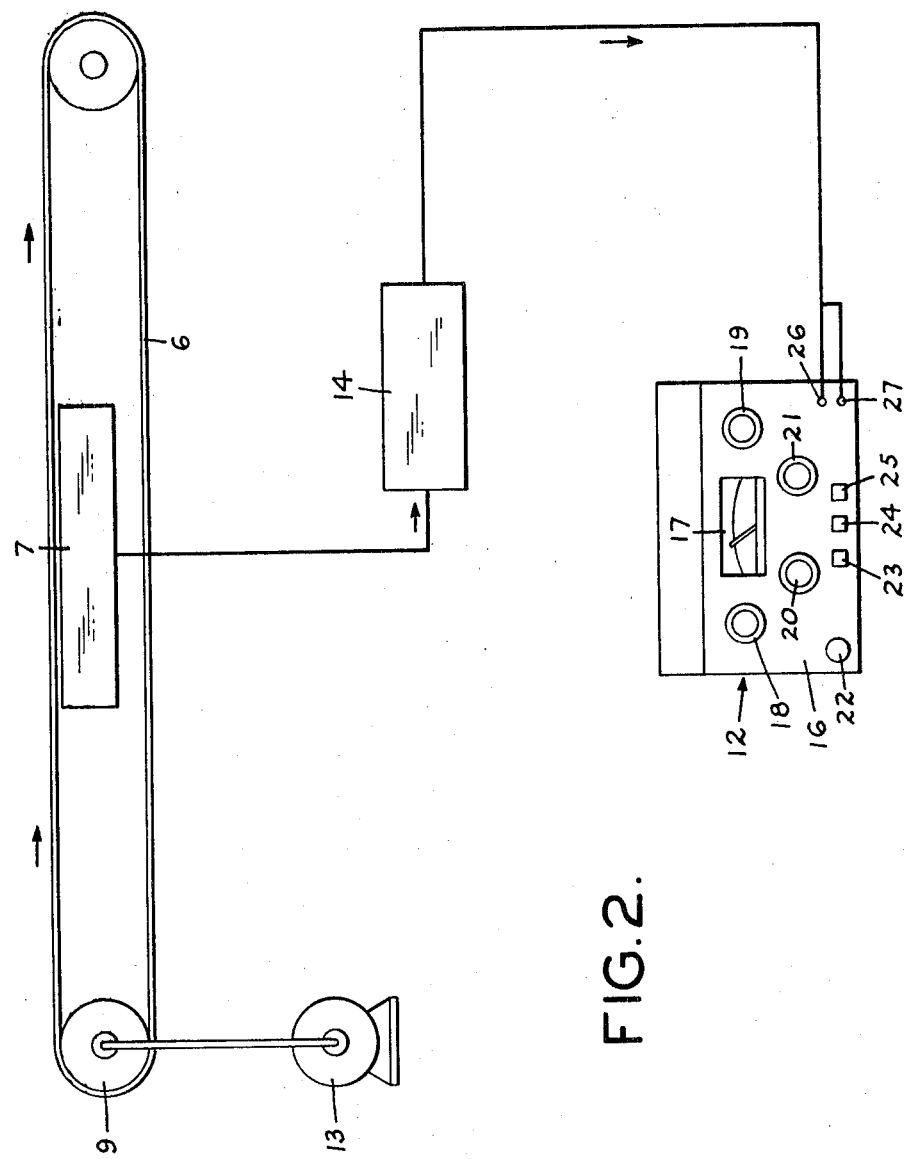

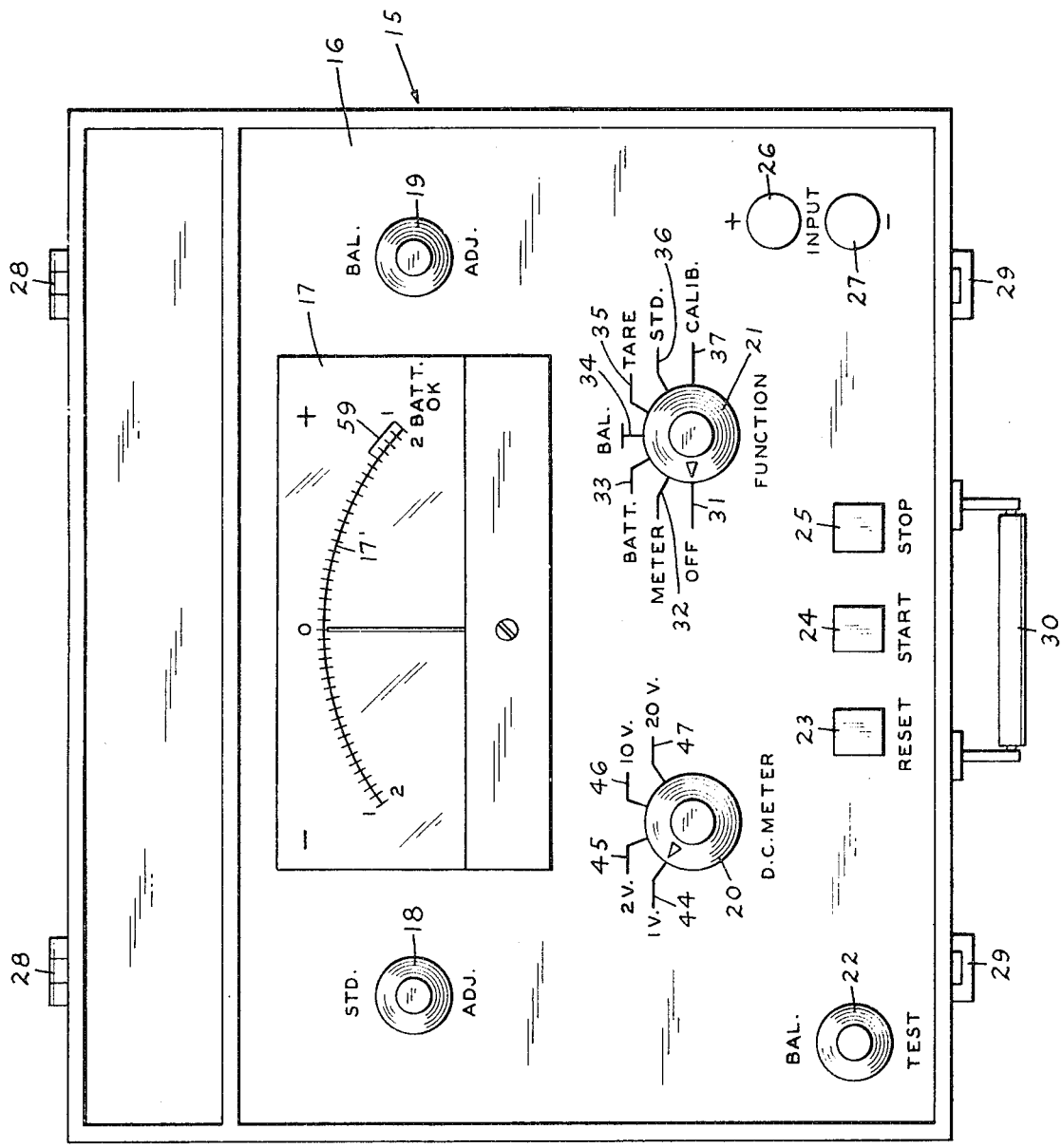

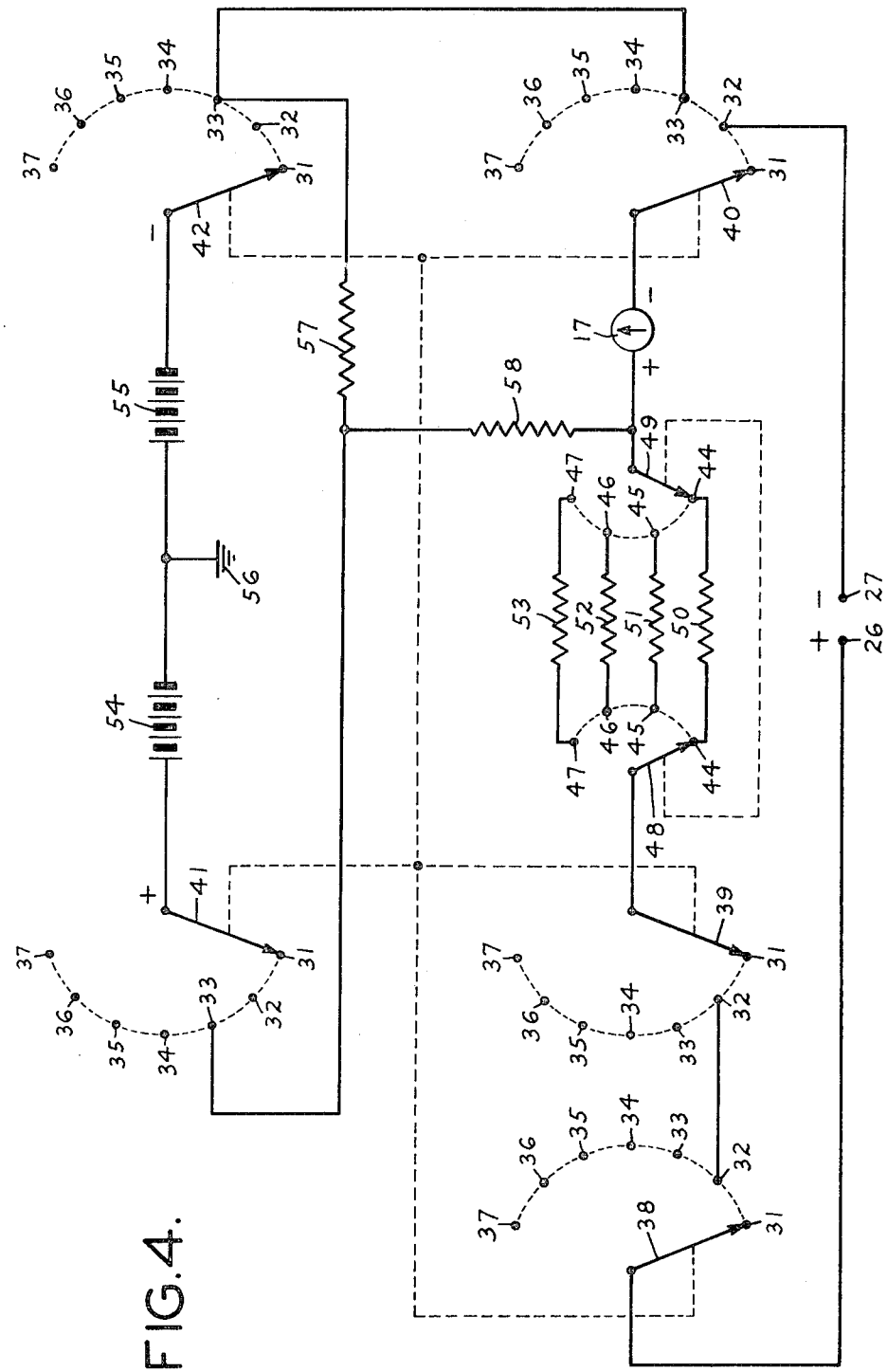

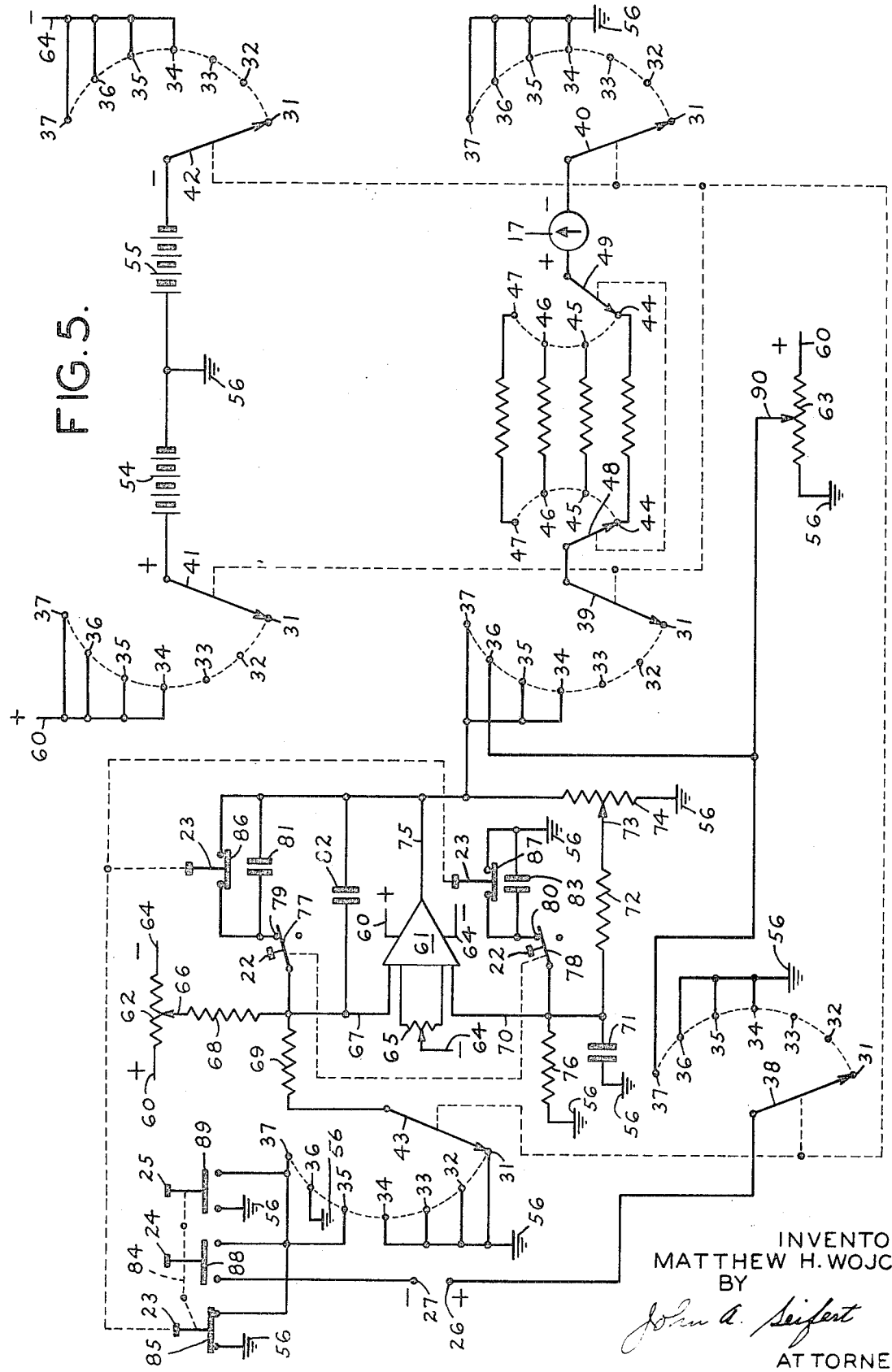

DEVICE FOR MEASURING TARE AND CALIBRATION ERRORS OF CONVEYOR BELT WEIGHING SCALES

The invention comprises a battery-operated device provided with a zero-centered scale-type meter actuated by an electrical circuit receiving electrical signals from an electrical analog multiplier whose output is the product of the weight-sensing platform and the rate of travel of the conveyor belt, or from a conveyor scale having a fixed belt speed and an electrical signal output due to weight. Said electrical circuit comprises a multiposition rotary switch having seven contact positions mechanically interlocked with six rotary switch arms actuated by a single knob of the device to select one of six functional positions from an "off" position including "meter," "-battery," "balance," "tare," "standardize," and "calibration." The electrical circuit also includes another multiposition rotary switch having four contact positions mechanically interlocked with two rotary switch arms actuated by a single knob of the device to select one of four resistors, said two rotary switch arms being electrically connected to two of the six rotary switch arms of the first multiposition rotary switch with one of said connections being through the meter to measure direct current voltages or to connect the device to the analog multiplier or the amplified weight. The batteries of the device are electrically connected to two other switch arms of the six rotary switch arms of the first multiposition rotary switch to measure the condition of the batteries which is indicated on the meter. One of the six rotary switch arms connected to the batteries connects the batteries to the positive terminal of an operational amplifier and the first two of three potentiometers. The other switch arm of the six rotary switch arms connected to the batteries connects the functional positions "-balance," "tare," "standardize," and "calibration" to the negative terminal of said operational amplifier and the first and third potentiometers. The first potentiometer is operated by a balance-adjusting knob of the device to zero out the offset current of the operational amplifier and the adjustment of said potentiometer is indicated on the meter above or below zero which enables the operational amplifier to be set precisely to zero on the meter. Said potentiometer balance-adjusting knob is adjusted when the six rotary switch arms are in the "-balance" position and a spring return, double-pole, double-throw switch of the device is depressed. When the spring return, double-pole, double-throw switch is depressed, the integrator response time is decreased which increases the integrator sensitivity by approximately 100 times thus enabling a very fine zero adjustment of the balance-adjusting potentiometer. The device is also provided with three pushbuttons mechanically interlocked with each other. Depressing the first of said buttons will reset the integrator to zero. When the second pushbutton is depressed, the first pushbutton will be actuated to open circuit position due to the mechanical interlocked and integration will start. When the third pushbutton is depressed, the second pushbutton will open due to the mechanical interlock and integration will stop. If the six rotary switch arms are in "tare" position, the meter will indicate the charge on capacitors in the circuit of the operational amplifier and the first and third potentiometers due to integration and the amount of said charge indicated on the meter will be determined by the setting of the multiposition switch having the four contact positions. The second potentiometer is externally actuated by a standardize adjusting knob of the device to the desired standardized voltage which will be indicated on the meter when the six rotary switch arms are in the "standardize" position. When the six rotary switch arms are in "-calibration" position, the second pushbutton is depressed and the desired standardized voltage of the second potentiometer is compared to the signal voltage of the analog multiplier or similar tare signal source. If the endless conveyor belt scale is not calibrated properly, the voltage across the analog multiplier or the amplified weight will not equal the desired standardized voltage at the second potentiometer. Under these conditions, integration of the difference in voltage will be indicated by the meter as an error in calibration.

In the accompanying drawings:

FIG. 1 is a diagrammatic view showing the invention connected to one type of electrical conveyor weighing system;

FIG. 2 is a diagrammatic view showing the invention connected to another type of electrical conveyor weighing system;

FIG. 3 is a top view of the device forming the embodiment of the invention and showing an instrument panel in a casing with its cover removed;

FIG. 4 is a schematic view of part of the electrical circuit forming the invention to perform the "direct current meter" function and the "battery test" function from the "off" position; and FIG. 5 is a schematic view of the entire circuit including the portion shown in FIG. 4 for performing the "balance adjust" function, "tare measurement" function, "standardization" function and "calibration" function.

The invention is shown in FIG. 1 being used to test an endless conveyor belt scale consisting of an endless conveyor belt 6 having the load-carrying portion traveling over a weight-sensing platform and transducer 7 electrically connected to an analog multiplier 8. The speed or rate of travel of the conveyor belt 6 is transmitted from a belt-supporting roller 9 through a coupling 10 to a speed-sensing device 11 electrically connected to the analog multiplier 8. The weight-sensing platform and transducer 7 produces an electrical output directly proportional to the weight or load on the conveyor belt 6. The speed-sensing device 11 provides an electrical output directly proportional to the speed or rate of travel of the conveyor belt 6. The electrical output of the transducer 7 and the speed-sensing device 11 are transformed in the analog multiplier 8 into a rate output signal which is electrically transmitted to a device designated in a general manner at 12.

In FIG. 2, the conveyor belt 6 is driven at a constant rate or fixed speed by an electric motor 13 so that the electrical output of the transducer 7 is transmitted to a weight amplifier 14 whose output voltage is transmitted to the device 12.

FIG. 3 discloses a casing 15 in which the electrical circuits are housed. The top of the casing is provided with a panel 16 having zero center electric meter 17 arranged with a scale 17' with negative and positive calibrations on the opposite sides of zero with a rotary "standardize adjustment" knot 18 on one side of the meter 17 and a rotary "balance adjustment" knob 19 on the opposite side of the meter. There are provided a "-direct current meter" rotary switch knob 20 and a "function" rotary switch knob 21 below the opposite end portions of the meter 17. Adjacent the side of the panel 16 opposite the side arranged with the meter 17 and the knobs 18 and 19, there are provided a "balance test" pushbutton 22, three pushbuttons 23, 24, and 25 designated "reset," "start," and "stop," respectively, and terminals 26 and 27 for electrical connection with either the analog multiplier 8, weight amplifier 14, or a source of electricity.

The casing 15 is also provided with hinges 28 for a cover, not shown, snap locks 29 for said cover and a handle 30.

FIG. 4 shows part of the electric circuit including a first switch mechanism comprising a multiposition rotary switch having seven contacts 31, 32, 33, 34, 35, 36, and 37, and six mechanically interlocked rotary switch arms 38, 39, 40, 41, 42, 43 (FIG. 5) actuated by the knob 21.

A second switch mechanism is provided in this part of the circuit shown in FIG. 4 and comprising a multiposition rotary switch having four contacts 44, 45, 46 and 47, and two rotary switch arms 48 and 49 actuated by the knob 20. The contacts 44, 45, 46, and 47 are provided with multiplier resistors 50, 51, 52, and 53, respectively, and representing in the present illustration 1, 2, 10, and 20 volts, respectively. The switch arm 48 of the second switch mechanism is electrically connected to the switch arm 39 of the first switch mechanism and the switch arm 49 of the second switch mechanism is electrically connected to the positive terminal of the meter 17. The negative terminal of the meter 17 is electrically connected to the switch arm 40 of the first switch mechanism. The positive terminal 26 is electrically connected to the switch arm 38 and the negative terminal 27 is electrically connected to the switch arm 40 through the contact 32.

By positioning the switch arm 38 on the meter contact 32 of the first switch mechanism, the device is used as a standard direct current voltmeter by completing the circuit from the terminal 26 to the switch arm 38, contacts 32, switch arm 39 of the first switch mechanism, switch arm 48, the preselected contact of the contacts 44, 45, 46, and 47 and resistors 50, 51, 52, and 53, and the switch arm 49 of the second switch mechanism to the positive terminal of the meter 17 and from the negative terminal of the meter 17 to the switch arm 40 and the contact 32 of the first switch mechanism and to the negative terminal 27. The terminals 26 and 27 are connected to a source of electricity to measure direct current voltage, or to the analog multiplier 8 or to the weight amplifier 14 to test the endless conveyor belt scale.

When the knob 21 is adjusted to the "battery" position 33, the condition of the batteries 54 and 55 mounted in the casing 15 is indicated on the meter 17. The batteries 54 and 55 are connected in series and the junction between the batteries 54 and 55 is connected to a common or ground 56 which is not required for the "battery" function and is only used when knob 21 is actuated to the contact positions 34, 35, 36, and 37 which will be described hereinafter. The positive terminal of the battery 54 and the negative terminal of the battery 55, respectively, are connected in circuit with the switch arms 41 and 42, respectively, of the first switch mechanism and the contacts 33 of the first switch mechanism are in circuit with a load resistor 57 and a multiplying resistor 58 connected to the positive terminal of the meter 17, whereby the adjustment of the knob 21 to the "battery" position will complete a circuit from the positive terminal of the battery 54 to the switch arm 41, the contacts 33, the resistor 58, the meter 17, the switch arm 40, the contacts 33, the switch arm 42 to the negative terminal of the battery 55, and also through the resistor 57. The resistor 57 permits the batteries to be tested under actual operating conditions and the resistor 58 permits full scale indication on the meter scale 17' when the batteries 54 and 55 are fully charged. The meter scale 17' is provided with a green-colored bar 59 marked "batt. O.K." to be referred to when the batteries 54 and 55 are tested. When the meter pointer moves to a position within this bar 59, the batteries 54 and 55 are in good condition and when the pointer moves to a position outside this bar 59, the batteries should be replaced.

FIG. 5 shows the switch arm 41 connecting the positive terminal of the battery 54 to the contacts 34, 35, 36, and 37 of the first switch mechanism and to positive terminals 60 of an operational amplifier 61, and of potentiometers 62 and 63. The switch arm 42 connects the negative terminal of the battery 55 to the contacts 34, 35, 36, and 37 of the first switch mechanism and to negative terminals 64 of the operational amplifier 61, of the potentiometer 62 and of a potentiometer 65 connected to the operational amplifier 61. This provides the necessary bias voltages to the operational amplifier 61 and operating voltages to the potentiometers 62, 63, and 65, and only occurs when the "function" switch knob 21 is positioned in the last four functions of "balance," "tare," "standardize," and "calibration."

Potentiometer 62 is externally adjusted by the knob 19 and is used to zero out the offset current of the operational amplifier 61. The effects of the adjustment of the potentiometer 62 is indicated on the meter 17. The potentiometer 62 is provided with a slide 66 connected to an inverting input 67 of the operational amplifier 61 through a resistor 68. Potentiometer 62 can be adjusted so that either a positive or negative current flows through the resistor 68. This provides an adjustment above and below zero which enables the operational amplifier 61 to be set precisely to zero and indicate the same on the meter 17.

The inverting input 67 of the operational amplifier 61 is electrically connected to the switch arm 43 of the first switch mechanism through a resistor 69. The operational amplifier 61 is provided with a noninverting input 70 electrically connected to a capacitor 71 connected to the ground 56 of the batteries 54 and 55 and connected through a resistor 72 to a slide 73 of a potentiometer 74 connected to the ground 56 of the batteries 54 and 55 and to an output 75 of the operational amplifier 61. The noninverting input 70 is also connected to a resistor 76 connected to the ground 56.

Potentiometer 65 is a balance control and with no input signal and the resistors 69 and 76 shunted, the potentiometer 65 is internally adjusted for a zero offset voltage which is referred to the inputs 67 and 70 of the operational amplifier 61 and can be measured at the output 75. After potentiometer 65 is adjusted for zero offset voltage, the potentiometer 62 can be adjusted by the knob 19 for a zero offset current. Under these conditions, the operational amplifier 61 is zeroed for both offset voltage and current while no signal is applied to the terminals 26 and 27.

Potentiometer 74 is a regenerative control and is internally adjusted to prevent the input bias current of the operational amplifier 61 from producing drifts in the output 75. After the correct adjustment of the potentiometer 74 is above or below zero, a positive feedback voltage is applied from the output 75 to the potentiometer 74 and from the slide 73 through resistor 72 to the noninverting input 70 of the amplifier 61. The purpose of this positive feedback is to neutralize the bias current produced by the operational amplifier 61, which would be indicated as a drift on the meter 17. This drift is most evident when the zero center of the meter 17 indicates at or near full scale in either the positive or negative direction. Insufficient positive feedback will allow the operational amplifier 61 and in turn the pointer of the meter 17 to drift toward zero. An excess of positive feedback will cause the operational amplifier 61 and the pointer of the meter 17 to drift up-scale away from zero. The proper adjustment is when the meter pointer remains stationary and shows no drift in either direction while it is indicating above zero and in either the positive or negative position.

The knob 19 is adjusted when the "function" switch knob 21 is in the "balance" position and only after the "balance test" button 22 is depressed. The button 22 actuates a spring bias or return double-pole, double-throw switch having switch arms 77 and 78 engaging contacts 79 and 80, respectively, when in the normal circuit closing position with the button 22 in nondepressed position. The switch arm 77 is electrically connected to the inverting input 67 and the switch arm 78 is electrically connected to the noninverting input 70 of the operational amplifier 61. The normally closed contact 79 is connected to a large nonpolarized capacitor 81 which is approximately 10 microfarads from the output 75 through the switch arm 77 to the inverting input 67 of the operational amplifier 61. When the contact 79 is closed, the capacitor 81 is in parallel with a smaller capacitor 82 which is approximately one-tenth of a microfarad. Both capacitors 81 and 82 are in the negative feedback circuit. The other normally closed contact 80 is connected to another large nonpolarized capacitor 83 of approximately 10 microfarads connected to the ground 56. The normally closed contact 80 forms a circuit from the ground 56 through the switch arm 78 to the noninverting input 70 of the operational amplifier 61. The capacitor 71 is normally one-tenth of a microfarad and is in parallel with the capacitor 83.

Capacitors 81 and 82 being in parallel and in the negative feedback circuit of the operational amplifier 61 are also in series with the input resistor 69 and provide integration of a voltage that may be at the switch arm 43.

Capacitors 71 and 83 and resistor 76 are in parallel with each other and their parallel impedance is equal to the parallel input impedance of the capacitors 81 and 82 and the resistor 69. Having an equal impedance at both inputs 67 and 70, minimizes the differential input bias currents of the operational amplifier 61.

When the "balance test" button 22 is depressed, both capacitors 81 and 83 are disconnected and only the capacitors 82 and 71 are in the circuit. In this position, the integrator response time has decreased which increases the integrator sensitivity by approximately 100 times, thus enabling a very fine zero adjustment of the balance adjustment potentiometer 62.

Pushbuttons 23, 24, and 25 are mechanically interlocked by linkage 84. "Reset" button 23 actuates a three-pole normally open switch with contacts 85, 86, and 87 of said switch shown in FIG. 5 as being closed. When the "balance test" button 22 is not depressed, the contact 86 shorts and discharges the capacitors 81 and 82. The contact 87 shorts and discharges the capacitors 71 and 83, thus resetting the integration to zero.

When the "function" switch 21 is in contact positions 35 or 37 and the "reset" button 23 is depressed, the input resistor 69 cannot receive an input signal voltage from the negative terminal 27.

The "start" button 24 actuates a single-pole switch 88 and when said button 24 is depressed, the switch 88 is closed, the "reset" button 23 props up and the contacts 85, 86, and 87 all open due to the mechanical interlock 84. In this position, the capacitors 71, 81, 82, and 83 are not shorted and integration is allowed to start.

When the "function" switch 21 is in the "tare" contact position 35, the "start" button 24 is depressed, the positive terminal 26 is connected to the ground 56 through the switch arm 38 and the contact 35. The negative terminal 27 is connected to the switch 88 then to the contact 35, switch arm 43 and the input resistor 69. If a voltage appears across terminal 26 and 27, it will start integration by the operational amplifier 61 charging the capacitors 81 and 82 through the resistor 69. The direction or polarity of the charge is determined by the polarity of the voltage across the terminals 26 and 27 which may be reversed from that shown in Fig. 5.

The "stop" button 25 actuates a single-pole switch 89 and depressing said button 25 will close the switch 89 and the "start" button 24 pops up and the switch 88 opens due to the mechanical interlock 84. If at this time, the "function" switch 21 is in the "tare" contact position 35, the charge due to integration on the capacitors 81 and 82 will be retained. The meter 17 will indicate this charge and hold this reading for a long time, because the input impedance to inputs 67 and 70 and equal, operational amplifier 61 was balanced for zero and for proper regeneration at or near full output. The percent of charge indicated on the meter 17 will be determined by the setting of the "direct current meter" switch 20.

Potentiometer 63 is provided with a slide 90 adjusted by the knob 18 for the desired standardizing voltage which is indicated on the meter 17 when the switch arms 39 and 40 are in engagement with the "standardize" contacts 36. No integration is required in this position and therefore the input resistor 69 is connected to the ground 56 through the switch arm 43 and the contact 36.

When the "function" switch 21 is in the "calibration" contact position 37, a voltage can be applied to the input resistor 69 by depressing the "start" button 24. The signal voltage at the terminals 26 and 27 is in series with the voltage on the slide 90 connected to the contact 37 engaged by the switch arm 38 and the ground 56 of potentiometer 63. These two voltages are compared with each other and since the polarity of the input voltage at the terminals 26 and 27 must be as shown in FIG. 5, the input voltage polarity will be opposite to the polarity of the voltage on the slide 90 and the ground 56 of the potentiometer 63, and a difference in voltage will appear at the input resistor 69.

If the endless conveyor shown in FIGS. 1 and 2 is not calibrated properly, the voltage across the terminals 26 and 27 will not equal the desired standardized voltage at the slide 90 and the ground 56. Under this condition, integration of the difference in voltage will take place by the operational amplifier 61, resistor 69 and capacitors 81 and 82. The polarity or direction of this integration will be determined by the input signal level, that is if the input signal across the terminals 26 and 27 is greater than the standardized voltage at the slide 90, the difference between these two voltages will be negative at the input resistor 69. The output 75 will increase in the positive direction because of the inversion in the operational amplifier 61. If the input signal at the terminals 26 and 27 is smaller than the standardized voltage at the slide 90 and the ground 56, the difference will be positive at the input resistor 69. The output 75 will decrease or go in the negative direction. The meter 17 through the "direct current meter" switch knob 20 will indicate this difference as an error in calibration. When the input signal at the terminals 26 and 27 is equal to the standardized voltage at the slide 90 to the ground 56, no difference will appear and no error will be indicated on the meter 17 thereby indicating the endless conveyor scale is properly calibrated.

However endless conveyor belts have irregularities in tare weight and will always produce a difference in voltage which will vary above and below zero. If an endless conveyor scale was properly adjusted for tare, then variations in tare will always average out to zero for one conveyor belt revolution and no error will be indicated on the meter 17. The indication on the meter 17 is at zero when the "reset" button 23 is depressed and integration of this error is started by depressing the "start" button 24. After one or more conveyor belt revolutions, the integration is stopped by depressing the "stop" button 25. A reading on the meter 17 will indicate the magnitude and polarity of the error if it exists.

The calibration test procedure is similar to the procedure for tare measurement, that is, after the device is standardized, test chains or test weights are placed on the endless conveyor belt.

Having thus described my invention, I claim:

1. In a device for measuring tare and calibration errors of conveyor belt weighing scales, a zero center electric meter, a first switch mechanism having a plurality of contacts and interlocked switch arms, the first of said switch arms being electrically connected to the meter, a source of electricity connected to said switch mechanism, a second switch mechanism electrically connected to the meter and to a second switch arm of the first switch mechanism, a plurality of multiplier resistors, each resistor being connected to a different contact of the second switch mechanism, an electric battery connected to a third and fourth switch arm of the first switch mechanism, an amplifier electrically connected to predetermined contacts of the first switch mechanism, a plurality of potentiometers electrically connected to said predetermined contacts of the first switch mechanism and to the amplifier, a single potentiometer electrically connected to the predetermined contacts of the first switch mechanism and to the battery, a double-pole, double-throw switch connected to the amplifier and to the plurality of potentiometers, and a plurality of pushbutton-actuated switches, the first of said pushbutton-actuated switches being provided with three poles connected to the battery, to predetermined contacts of the first switch mechanism and to the double-pole, double-throw switch, the remaining pushbutton-actuated switches being single-pole switches connected to predetermined contacts of the first switch mechanism and one of said remaining pushbutton-actuated switches being connected to the source of electricity.

2. In a device for measuring tare and calibration errors of conveyor belt weighing scales as claimed in claim 1, a resistor interposed between the amplifier and one of the plurality of potentiometers whereby adjustment of said potentiometer will cause a positive or negative current flow through said resistor to set the amplifier to zero.

3. In a device as claimed in claim 1, a load resistor interposed in the circuit of a predetermined contact of the first switch mechanism to enable the electric battery to be tested under actual working conditions.

4. In a device as claimed in claim 3, a multiplying resistor interposed in the circuit of said predetermined contact of the first switch mechanism and the meter to provide full scale indication of the condition of the battery.

5. A device as claimed in claim 1, wherein the electric battery, the contacts of the first switch mechanism, predetermined potentiometers and predetermined pushbutton-actuated switches are electrically connected together.

6. A device as claimed in claim 1, wherein the double-pole, double-throw switch is provided with a spring bias pushbutton normally closing the circuit of said switch in its normal nondepressed position.

7. In a device as claimed in claim 1, two pairs of capacitors connected in circuit with the double-pole, double-throw switch and the first of the pushbutton-actuated switches to minimize the differential input bias currents of the amplifier.

8. A device as claimed in claim 7, wherein the first of the pushbutton-actuated switches actuated to closing position and the double-pole, double-throw switch in normal circuit closing position will short and discharge the capacitors and reset the amplifier to zero.

9. A device as claimed in claim 7, wherein depressing the pushbutton-actuated switch connected to the source of electricity will charge the capacitors and start integration.

10. In a device for measuring tare and calibration errors of conveyor belt weighing scales, a zero center electric meter, a first switch mechanism having a plurality of contacts and interlocked switch arms, the first of said switch arms being electrically connected to the meter, a source of electricity connected to said first switch mechanism, a second switch mechanism having a plurality of contacts and interlocked switch arms electrically connected to the meter and to a second switch arm of the first switch mechanism, and a plurality of multiplier resistors, each resistor being connected to a different contact of the second switch mechanism, the positioning of the switch arms of the first switch mechanism on a predetermined contact of said first switch mechanism and the positioning of the contact arms of the second switch mechanism on the contact of said second switch mechanism connected to the desired multiplier resistor will indicate the voltage of the device on the meter.

11. In a device as claimed in claim 10, an electric battery connected to a third and fourth switch arm of the first switch mechanism and a load resistor connected to a predetermined contact of the first switch mechanism whereby positioning of the third and fourth switch arms on said predetermined contact of the first switch mechanism will actuate the meter to indicate the condition of the battery.

12. In a device as claimed in claim 11, an amplifier electrically connected to predetermined contacts of the first switch mechanism, and positioning of the third and fourth switch arms on said predetermined contacts of the first switch mechanism provides bias voltage to the amplifier.

13. In a device as claimed in claim 12, potentiometers electrically connected to the predetermined contacts of the first switch mechanism and to the amplifier and the positioning of the third and fourth switch arms on said predetermined contacts of the first switch mechanism provides operating voltages to the potentiometers.

14. In a device as claimed in claim 12, a potentiometer electrically connected in the circuit of the amplifier to prevent input bias current of the amplifier from producing drifts in the output of the amplifier.

15. In a device as claimed in claim 13, a double-pole, double-throw switch connected to the amplifier and to the potentiometers and normally in circuit closing position, one of said potentiometers being manually adjustable, and the double-pole, double-throw switch being adjusted to circuit opening position during adjustment of said manually adjustable potentiometer.

16. In a device as claimed in claim 15, a pair of capacitors connected in circuit with each pole of the double-pole, double-throw switch to control the amplifier.

17. In a device as claimed in claim 16, a plurality of interlocked pushbutton-actuated switches, the first of said pushbutton-actuated switches being provided with three poles connected to the battery, to predetermined contacts of the first switch mechanism and to the double-pole, double-throw switch, whereby the double-pole, double-throw switch is in its normal circuit closing position, the actuation of the first of the pushbutton-actuated switches to circuit closing position will short and discharge the capacitors to reset the integration to zero on the meter.

18. A device as claimed in claim 17, wherein the second of the pushbutton-actuated switches is connected to the source of electricity and to two contacts of the first switch mechanism, and the closing of said pushbutton-actuated switch will start integration.

19. A device as claimed in claim 17, wherein the third of said pushbutton-actuated switches is connected to the battery and to the contacts of the first switch mechanism connected to the second pushbutton-actuated switch, and the closing of said third pushbutton-actuated switch will hold the reading on the meter.

* * * * *